United States Patent Office 2,735,902
Patented Feb. 21, 1956

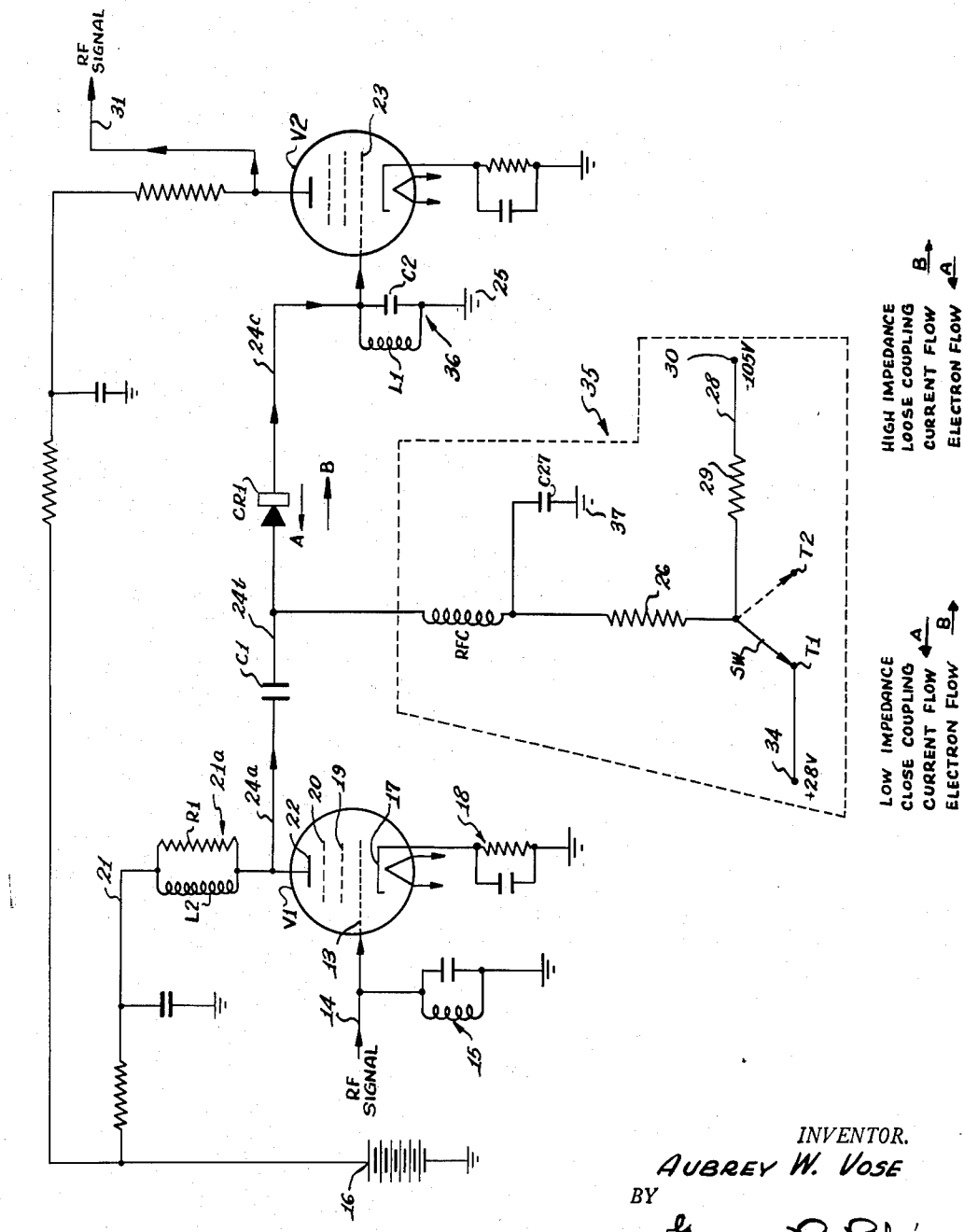

2,735,902

MEANS FOR CHANGING COUPLING IMPEDANCE

Aubrey W. Vose, Inglewood, Calif., assignor to The Houston Corporation, Los Angeles, Calif., a corporation of California Application June 25, 1951, Serial No. 233,303

1 Claim. (Cl. 179—171)

This invention relates to means for changing the width of the band of radio frequencies to which an amplifier stage will respond. It particularly relates to such a means for use in switching an amplifier circuit of radar equipment from an arrangement of components in which the circuit has a low Q value to one in which the circuit has a high Q value. A circuit of low Q value is capable of responding to a wide band of frequencies of RF waves such as characterizes the intermediate frequency pulse signals reflected from target objects. A circuit of high Q value responds to only a narrow band of frequencies of RF waves.

It has heretofore been the customary practice to effect this changing of the bandwidth by varying the arrangement of the circuit components by the use of mechanical means, such as relays and switches. In accordance with this invention the same result is accomplished in a superior manner by the use of a single mechanical switch and a crystal diode, the switch serving as a means of reversing the polarity of a D. C. voltage applied to the crystal.

The use of the switching method of this invention realizes several advantages, the effecting of which are among the purposes of the invention. The switching means and the accompanying circuits and circuit components are of reduced size and weight, two very important advantages in airborne radar equipment. Another advantage is the lower capacity which results from the reduced number and mass of the metal parts as compared to that of the relays, switches and leads present when switching is accomplished solely by these devices. Also there is relative freedom from the regenerative troubles encountered from the necessary location of relays and contacts in or near RF circuits, causing feedback due to capacity coupling and other unavoidable characteristics of circuits associated with these switching devices.

The figure of the drawing is a diagram of an RF amplifier circuit embodying the invention in one form. The invention is not necessarily limited to the specific components shown, or to their specific arrangement, or to any specific characteristic values thereof set forth herein for illustrative purposes, but is defined in the appended claims.

In the drawing V1 and V2 represent two pentode tubes in a multistage amplifier for amplifying RF signals, which, in the embodiment of the invention shown herein, are pulse modulated intermediate frequency waves of a radar set. The control grid 13 of tube V1 receives the incoming RF signals on conductor 14, together with negative grid biasing D. C. voltage from the conventional tuned circuit 15, resulting from the voltage drop across the cathode circuit 18 of the cathode 17 of tube V1. The screen and suppressor grids 19 and 20 have connections (not shown) to any circuits of conventional design, suitable for their purpose. The D. C. supply voltage to the plate 22 of the tube V1 is obtained from the positive source 16 over conductor 21. A resistor R1 is designed to give the necessary damping to the amplifier tuned circuit to provide the required bandwidth figure for the radar system, as for instance 60 megacycles plus or minus 5 megacycles in the case of the RF signal waves from the mixer of a radar set when used in receiving and detecting signals reflected from scanned target objects. Preferably an inductor L2 is connected in parallel with resistor R1 for a purpose later explained. The plate 22 of tube V1 is connected to the grid 23 of the tube V2 by leads 24a, 24b, 24c in which are connected in series a capacitor C1 of a normal coupling capacity of low RF impedance, and a crystal CR1. The crystal CR1 is of the type in which a finely pointed conductor, of for instance tungsten, shown as a solid triangle at the leftward end of the symbol representing the crystal in the drawing, contacts an adjacently positioned, relatively extended surface of a small piece of a metal, such as germanium (shown as a solid rectangle at the rightward end of the symbol representing the crystal CR1 on the drawing).

Such a crystal is characterized by a high resistance (as for instance a resistance of .5 megohm) when the potential applied to the crystal is such as to tend to cause current to flow in the direction of the arrow B in the drawing, and by a low resistance (as for instance 70 ohms) when the current flow is in the direction of the arrow A. Also the nature of the crystal is such that it has an inherent capacity of low value, for example one micromicrofarad, which acts in shunt relation to its resistance, irrespective of the direction of the applied potential. The two amplifiers V1 and V2 are thus coupled by capacitor C1 and crystal CR1 with its shunt capacity.

This coupling may be either loose when the current tends to flow through the crystal in the direction of arrow B or close when the current tends to flow in the other direction, i. e. that of arrow A. D. C. current is caused to flow in the direction of arrow A from source 34 through the crystal CR1 by throwing a switch SW to a position in which it contacts switch terminal T1. The positive low impedance source 34 of voltage may have, for example, a potential of 28 volts; the circuit is designed so that with switch SW in T1 position, a net effective positive voltage is applied to the crystal in the direction of arrow A irrespective of the value of the RF signals voltage out of V1. The D. C. current which is relatively high due to the low resistance of CR1 when conducting in the direction A, flows from switch SW, through resistor 26 of, for example, 10 kilohms and through the choke coil RFC, interposed to prevent passage of RF signals, thence, through the crystal CR1 and over conductor 24c, and coils to ground 25. Capacitor C27 is placed in a lead to ground 37 from the outer end of the choke coil RFC as additional means of shutting off stray RF signals.

The low impedance in the coupling C1—CR1 (70 ohms) when SW is at position T1 has the effect of placing resistor R1 in parallel with the now closely coupled high Q tuned circuit 36 of the grid 23 of tube V2, this latter circuit consisting of L1—C2. The damping effect of R1, when the coupling is close because of its low impedance, gives the circuit L1—C2 a low value of Q, thereby passing an RF signal of relatively wide frequency band. The inductors L1 and L2, which are, under these conditions, in parallel relation, are designed to balance the total circuit capacitance including capacitance C2, for tuning at the center frequency. The value of L2 is designed to balance the inherent plate to ground capacity of the tube V1, so that when the plate 22 of tube V1 is loosely coupled to the grid 23 of tube V2, as will later appear, plate 22 will have a tuned RF load at signal frequency independently of the tuned circuit 36.

If, now, it is desired to pass a wave signal of a narrow frequency band, as for example a wave from the mixer of a band frequency of 60 megacycles, plus or minus 0.5 megacycle, the switch SW is thrown to position T2.

This is an open position, but the inner end of switch SW is connected by lead 28 to any conveniently available source 30 of negative voltage, as for instance −105, which if too high, may be reduced to a satisfactory value with respect to the circuit to which it is to be applied, by a resistor 29. D. C. current then flows from ground 25 through CR1 in the direction of arrow B to the connection at 30.

The components of the entire voltage reversing circuit, designated as a whole by the numeral 35 are designed so that when switch SW is in T1 position, the potential of the low impedance positive source at contact T1 overrides the effect of the negative potential applied to lead 28, and transmits a positive potential through resistor 26 and the choke coil RFC.

A constant negative potential applied to the crystal CR1 in the direction of the arrow A from D. C. source 30, makes the crystal appear as a .5 megohm resistor, and the coupling between the two amplifiers is then almost wholly due to the very small shunt capacity of one micro-microfarad of the crystal. This loose coupling relatively isolates the damping resistor R1 from the circuit 36 (L1—C2), decreasing its loading effect allowing the amplifier V2 to independently operate as a high Q narrow band circuit. When V2 is closely coupled, and the inherent capacitance of the tube V1 is added to the C2 capacitor, the additional inductance L2 must be provided to maintain the balance for tuning to center frequency. For that reason L2 is included in the circuit 21a. For if L1 was, as would normally be the case, designed to balance the total interstage capacity, it would be too large and out of tuning balance when the tube V2 is relatively isolated from tube V1 by its loose coupled condition.

The frequency bandwidth of the amplifier is determined by the tuned circuit 36 (comprising L1, C2), and the damping resistor R1 which form the load for the tube V1. The bandwidth is broad when the resistor R1 is closely coupled to the circuit 36 and is narrow when the resistor R1 is loosely coupled to the circuit 36.

The RF signals of pulses of either narrow or broad frequency bandwidth, as the case may be, are amplified in tube V2 and transmitted over lead 31 for whatever disposition is indicated by the nature of the radar or other equipment. The path of the RF signals is indicated by arrow heads on the conductor lines on the drawing, beginning at the left end of conductor 14, and terminating at the right end of conductor 31. It will be noted that when the switch SW is in position T2, the much higher impedance of the crystal shunt capacity which, because of the .5 megohm resistance, is then the controlling coupling capacity, lowers the value of the RF voltage applied to the grid 23 of tube V2, and this compensates for the higher Q and resulting higher gain of amplifier V2, maintaining the gain of the stage fairly constant. Also the minus D. C. voltage applied to the crystal when SW is at position T2 is of great enough value to maintain the high impedance in the crystal, regardless of the value of the RF signal voltage out of V1. Otherwise the lowered impedance would permit resistor R1 to broaden out the bandwidth.

I claim:

An amplifier comprising two amplifier stages connected in cascade, one of said stages having a comparatively high Q circuit, the other of said stages including resistance that may be effectively inserted in said high Q circuit by way of coupling between said two stages to thereby broaden the frequency pass band of said amplifier, a crystal connected between said stages to couple them and having the quality of a high impedance when an impressed net effective voltage is acting in one direction, and a low impedance when an impressed net effective voltage is acting in the other direction; means for applying a D. C. voltage to the crystal in one direction; means for applying a D. C. voltage in the other direction; said D. C. voltage being of a value sufficient to substantially override any radio frequency voltage applied in opposing direction; and means for selectively applying said voltages to said crystal simultaneously with the application of said radio frequency voltage thereto, said means for selectively applying said voltages to the crystal comprising a lead devoid of condensers from a D. C. voltage source connected to one side of said crystal; R. F. frequency filter means in said lead; a first conductor between the said lead and the negative side of a source of direct current; a second conductor connected to the positive side of a low impedance source of direct current; switch means for selectively opening or closing a connection between said lead and said second conductor, the relative resistance in said first conductor and said lead being proportioned to apply a substantial positive voltage to said crystal when the switch means is in closed position.

References Cited in the file of this patent

UNITED STATES PATENTS

| | | |
|---|---|---|
| 2,142,038 | Bier | Dec. 27, 1938 |
| 2,185,199 | Kahn | Jan. 2, 1940 |
| 2,210,381 | Richnitzer | Aug. 6, 1940 |
| 2,255,690 | Wheeler | Sept. 9, 1941 |
| 2,443,195 | Pensyl | June 15, 1948 |
| 2,511,468 | Harrison | June 13, 1950 |